United States Patent
Qian et al.

(10) Patent No.: US 8,244,862 B2
(45) Date of Patent: *Aug. 14, 2012

(54) MONITORING NETWORK PERFORMANCE TO IDENTIFY SOURCES OF NETWORK PERFORMANCE DEGRADATION

(75) Inventors: Tin Qian, Bellevue, WA (US); Aravind Ramarathinam, Redmond, WA (US); Michael Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,545

(22) Filed: Jul. 15, 2011

(65) Prior Publication Data

US 2011/0276688 A1    Nov. 10, 2011

Related U.S. Application Data (63) Continuation of application No. 12/072,936, filed on Feb. 29, 2008, now Pat. No. 7,991,881.

(51) Int. Cl.
    *G06F 15/173*    (2006.01)
(52) U.S. Cl. .................. 709/224; 370/229; 370/352
(58) Field of Classification Search ............ 370/237, 370/252, 352, 236; 714/57; 375/222
    See application file for complete search history.

(56) References Cited

U.S. PATENT DOCUMENTS

| | | | |
|---|---|---|---|
| 5,819,028 A | | 10/1998 | Manghirmalani et al. |
| 6,757,255 B1 * | | 6/2004 | Aoki et al. .................. 370/252 |
| 6,795,400 B1 * | | 9/2004 | Schick .......................... 370/236 |
| 6,909,741 B1 * | | 6/2005 | Smith et al. .................. 375/222 |
| 7,194,002 B2 | | 3/2007 | Zhang et al. |
| 7,248,564 B1 | | 7/2007 | Grosdidier et al. |
| 7,567,504 B2 | | 7/2009 | Darling |
| 7,590,989 B2 | | 9/2009 | Yim |
| 7,653,700 B1 | | 1/2010 | Bahl et al. |
| 2003/0053455 A1 | | 3/2003 | Kryskow, Jr. |
| 2003/0177396 A1 | | 9/2003 | Bartlett et al. |
| 2005/0108071 A1 | | 5/2005 | Jain |
| 2005/0154768 A1 | | 7/2005 | Theimer et al. |
| 2006/0023638 A1 | | 2/2006 | Monaco et al. |
| 2006/0068769 A1 | | 3/2006 | Adya et al. |
| 2006/0182039 A1 | | 8/2006 | Jourdain et al. |
| 2006/0230134 A1 | | 10/2006 | Qian et al. |

(Continued)

OTHER PUBLICATIONS

Downey, A.B., "An empirical model of TCP performance," Olin College of Engineering, TR-2003-001, Aug. 2003, pp. 1-15, http://allendowney.com/research/tcp/downey-TR-2003-002.ps.

(Continued)

*Primary Examiner* — Dustin Nguyen
(74) *Attorney, Agent, or Firm* — L. Alan Collins; Collins & Collins Intellectual, LLC (57) ABSTRACT

A method of measuring, for communication paths between a networked computer and at least one other networked computer connected via a network performance, network information to detect network performance degradation and diagnose source(s) of the performance degradation. The diagnosis may be performed by a progressive elimination of possible sources. Network performance degradation may be attributed to problems at a local network or the Internet. The problem sources on the Internet may comprise, for example, an internet server provider (ISP) or a single remote server in communication with the networked computer. A network performance baseline established and maintained for each path may be employed in diagnosing the network performance degradation.

20 Claims, 7 Drawing Sheets

U.S. PATENT DOCUMENTS

| | | | |
|---|---|---|---|
| 2006/0233106 | A1 | 10/2006 | Achlioptas |
| 2007/0019618 | A1* | 1/2007 | Shaffer et al. .............. 370/352 |
| 2007/0177524 | A1 | 8/2007 | Qian et al. |
| 2007/0294754 | A1 | 12/2007 | Finkelstein |
| 2008/0095058 | A1* | 4/2008 | Dalmases et al. ............ 370/237 |
| 2008/0209273 | A1 | 8/2008 | Bahl |
| 2008/0320003 | A1 | 12/2008 | Heinson |
| 2009/0086640 | A1 | 4/2009 | Zhang |
| 2009/0086741 | A1 | 4/2009 | Zhang |
| 2009/0089438 | A1 | 4/2009 | Agarwal |
| 2009/0222553 | A1 | 9/2009 | Qian |
| 2009/0257361 | A1 | 10/2009 | Deshpande et al. |

OTHER PUBLICATIONS

Joo, Y. et al., "TCP/IP Traffic Dynamics and Network Performance: A lesson in Workload Modeling, Flow Control, and Trace-Driven Simulations," ACM SIGCOMM, Computer Communication Review, 2001, pp. 25-37, http://www.math.lsa.umich.edu/~annacg/papers/JRFGW01.ccr.pdf.

Landfeldt, B. et al., "Network Performance Monitoring for Applications Using Expand," 1999, pp. 1-12, http://www.it.usyd.edu.au/~bjornl/research/papers/eng_trans99.pdf.

Wang, R. et al., "Adaptive Bandwidth Share Estimation in TCP Westwood," UCLA Computer Science Department, http://www.cs.ucla.edu/NRL/hpi/tcpw/tcpw_papers/tcpw-abse-globe02cr.pdf.

* cited by examiner

| Destination | Mean Bandwidth | Max$_{ave}$ Bandwidth | Min$_{ave}$ Bandwidth | RTT$_{ave}$ | RTT$_{Var}$ | ... |
|---|---|---|---|---|---|---|
| A B C | ... | ... | ... | ... | ... | ... |

MONITORING NETWORK PERFORMANCE TO IDENTIFY SOURCES OF NETWORK PERFORMANCE DEGRADATION

RELATED APPLICATION

This application is a continuation of U.S. application Ser. No. 12/072,936, filed Feb. 29, 2008, which is incorporated herein by reference in its entirety.

BACKGROUND

Computing devices may communicate with other computing devices via connections over networks for a variety of reasons. For example, a user of a computing device may wish to obtain data from a server to perform computations or obtain audio or video content. In other instances, a user may wish to engage in an interactive application with a user of another computer or a program executing on a server or other device accessible over the network. The quality of service provided by the network can have a significant impact on the user's experience.

Tools to measure network performance are known. For example, network engineers frequently use traffic simulators and other types of test equipment to assess performance of a network or individual components within the network. Such tools can simulate network traffic generated by large numbers of users to test the network behavior under many operating conditions. Traffic analyzers are also known and may be used to perform test functions by detecting and analyzing messages being conveyed by a network. These powerful tools may also be programmed to perform other test-related functions.

Less powerful tools that run on an individual computer are also known. Tools such as a network "Ping" can be used to test connections. Additionally, many computers equipped for network communication also include components that perform limited performance monitoring as part of implementing certain network protocols or adapting network protocols for specific operating conditions. For example, some wireless protocols allow communication at different data rates. Computers communicating according to these protocols may detect and adapt to network conditions by changing the data rate in use.

SUMMARY OF INVENTION

To manage devices communicating over networks, network performance may be monitored. Network performance depends on various factors and fluctuates over time. When the network performance is below an expected performance, it may not be straightforward to identify a particular source of a problem.

In some embodiments, a method is provided to detect network performance degradation by a networked computer connected to a wide area network through a local network. The source(s) of the performance degradation may be diagnosed by a method of a progressive elimination. Thus, a number of possible source(s) of the detected performance degradation may be progressively narrowed down. Initially, it may be determined whether cross-traffic on a local network or one or more networked computers on a wide area network (e.g., the Internet) are sources of the performance degradation. If sources such as a Layer 3 connection problem, a Layer 2 problem or LAN cross-traffic are ruled out as sources of network performance problems, it may then be determined whether an Internet server provider (ISP) or a single remote server in communication with the networked computer over the Internet are sources of the network performance degradation.

A network performance baseline established and maintained for connections between the networked computer and other devices on the wide area network may be used in determining whether the network performance is below the expected performance. The information collected as part of the baseline may also be used in distinguishing between degradation caused by an ISP or a particular remote server.

In some embodiments, the network performance information may be used to determine whether a connection between the networked computer and any other device on a network is suitable for interactive network applications such as, for example, remote desktop, games applications and other suitable applications.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that network performance for connections between computers communicating over a network can be monitored by utilizing network performance parameters. The network performance parameters may be measured to determine a current status of the network. The inventors have also appreciated that network performance parameters may be used to establish and maintain a network performance baseline. The baseline may be maintained for each communication path between a networked computer and any other device on the network. The communication path may be a TCP/IP connection. The baseline may be maintained by updating the network performance parameters calculated from information obtained from the network during time intervals. In some embodiments of the invention, a moving average technique using asymmetric weighting factors may be employed to update some of the parameters. This approach allows maintaining the baseline within a desired range.

The inventors have further appreciated that the network performance may be affected by various factors. A bandwidth metric computed as a window size of the TCP/IP connection scaled based on RTT of the connection may be sampled during the time intervals. When the network performance is below some expected performance, for example, when the amount of traffic on the network is low and/or congestion is detected on the network, network performance parameters obtained for the path during such periods may corrupt the baseline and may therefore not be used to update the baseline.

The inventors have further appreciated that network performance information may be used to detect network performance degradation and diagnose source(s) of the performance degradation. The diagnosis may be performed using a method that can be referred to as a progressive elimination. Thus, a number of possible source(s) of the detected performance degradation may be progressively narrowed down. The sources may be, for example, network cross traffic on a local network or one or more networked computers on a wide area network (e.g., the Internet). The latter sources may comprise, for example, an Internet server provider (ISP) or a single remote server in communication with the networked computer.

Figure 1:
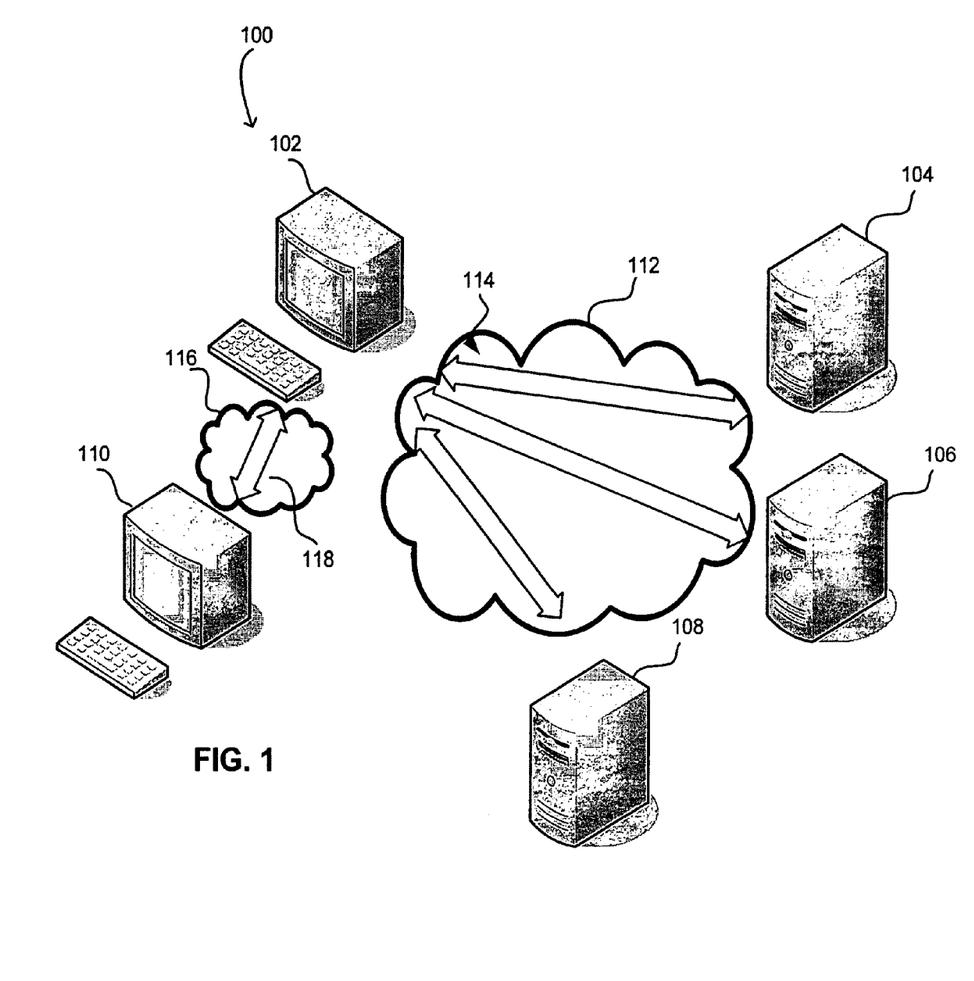
FIG. 1 is a sketch of an example of a network environment in which some embodiments of the invention may be implemented.

FIG. 1 illustrates an environment 100 comprising networked computers in which some embodiments of the invention may be implemented. A plurality of computers may communicate over a wide area network (WAN) and over a local area network (LAN). Computers may be connected to the WAN over the LAN. As shown in this example, a networked computer 102 communicates to other networked computers, 104, 106, and 108 via connections 114 through a network 112. Connections 114 are established over a WAN 112 which may be any suitable network such as, for example, the Internet, and computers 104, 106, and 108 may be servers implementing web sites or other services available over the Internet.

Some embodiments of the invention employ network performance parameters obtained from active connections. However, the aspects of the invention described herein are not limited in any respect by the manner in which the computer 102 communicates with computers 104, 106, and 108, and in which computers 104, 106, and 108 communicate with each other (if at all).

As shown in FIG. 1, computer 102 may communicate with a computer 110 via a connection 118 over a LAN 116. Connection 118 may be either a wireless or wired connection. For example, in some embodiments, connection 118 may be a wireless LAN using the IEEE 802.11 set of standards. In other embodiments, connection 118 may be a wired LAN using the IEEE 802.3 set of standards. Computers 102, 104, 106, 108, and 110 may be personal computers, workstations, servers, server clusters, mainframe computers, or any other computer systems. Although not shown in FIG. 1, it should be appreciated that connections between computers 102, 104, 106, 108, and 110 and between these computers and other computers that may be present on networks 112 and 116 are not limited to those shown in FIG. 1. For example, computer 110 may communicate with any of the computers 104, 106, and 108 over WAN 112. Computers 102, 104, 106, 108, and 110 may include one or more components of any type, as discussed in more detail below. In some embodiments, computers 102, 104, 106, 108, and 110 may deploy a Microsoft Windows® operating system. For example, the computers may deploy the Microsoft® Windows® Vista™ operating system.

Embodiments of the invention will be described below as implemented within computer 102. However, it should be appreciated that embodiments of the invention are not limited in this respect, and any suitable computer (e.g., any of the computers shown in FIG. 1).

In the embodiment illustrated, a network performance baseline may be computed using network performance values accessible to a single computer. In some embodiments, those values are obtained from processing parameter values measured or generated by networking hardware or software that may otherwise be present in a networked computer.

Figure 2:
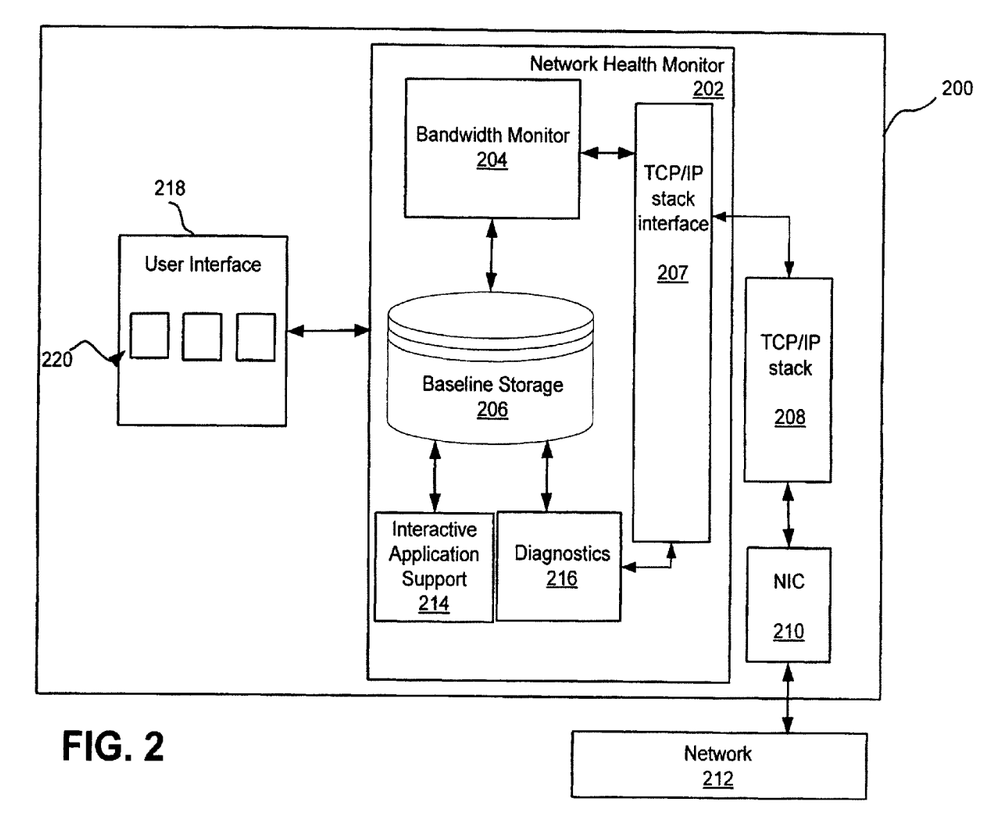
FIG. 2 is a block diagram of a system within a computer, according to some embodiments of the invention.

Network parameters, such as a delay parameter, may be alternatively or additionally generate or use performance information as described. For example, in embodiments where networks are Internet Protocol (IP) based network environments, a TCP/IP stack may track round trip time (RTT) of packets sent based on data obtained from a network interface card connected to the network. TCP/IP stack module 208 may be a component of the operating system or computer 200 as is known in the art or implemented in any other suitable way.

FIG. 2 is a block diagram illustrating a conceptual example of components that may be included in a system 200 in which some embodiments of the invention may be implemented. Components shown in this example may be hardware components or may be computer-executable instructions or computer data structures located, for example, in computer 102 (e.g., in a non-volatile memory) or in any other suitable computer and its components. It should be appreciated that FIG. 2 illustrates components of system 200 by way of example only and that system 200 may include any other suitable components. Moreover, each of the illustrated components may be combined with other component(s) and may comprise one or more sub-components.

In the example illustrated, a network health monitor module 202 comprises components in which some embodiments of the invention are implemented. In the example illustrated, health monitor module 202 is implemented as computer-executable instructions within an operating system for computer 200. Health monitor module 202 includes a bandwidth monitor 204 that performs calculations of the network performance parameters as described in more detail below. Bandwidth monitor 204 may poll a TCP/IP stack module 208 at certain time intervals. In some embodiments, a five second time interval is used. Bandwidth monitor 204 may obtain information from TCP/IP stack module 208 via a TCP/IP stack interface 207. However, it should be appreciated that embodiments of the invention are not limited in this respect and, in some embodiments, TCP/IP stack module 208 may provide the information directly to bandwidth monitor module 204 or via any other suitable component(s).

The TCP/IP stack may provide information relating to bandwidth on all active communication paths (i.e., TCP connections). Bandwidth monitor 204 may store information for one or more of these connections. In embodiments in which bandwidth monitor 204 stores information on less than all connections, the connections for which information is stored may be selected in any suitable way. For example, information may be stored for the most active connections, the most recently used connections or some other subset of the connections identified in any suitable way.

TCP/IP stack module 208 communicates with a network interface controller (NIC) 210 which may be a NIC as known in the art or any other suitable NIC providing an interface to a network 212 (e.g., a wireless or wired network). As is known in the art, TCP connection may be characterized by a window that is typically maintained by each device sending data over a network. The sender window specifies the amount of data (e.g., defined in a number of bytes) that a sender can send at one time before pausing to listen for an acknowledgement from a receiver. A device implementing the TCP/IP protocol may adjust the sender window size (referred to hereinafter as a sender congestion window size) during the TCP connection. Using known algorithms, the device may increase its congestion window size to improve efficiency by sending more data at once. However, if the window size becomes too large (e.g., greater than current available network bandwidth), the sender may not receive proper acknowledgement packets due to congestion or other sources of packet losses. In response, the device may reduce the congestion window (e.g., divide its size by half).

The window size can be used to derive an estimation of the bandwidth on a TCP connection. Ideally, as is known in the art, the congestion window size will converge on a value that holds the amount of data that the network can transmit during the interval in which a network transmission propagates from the sender to the receiver and an acknowledgment message propagates back. Thus, in some embodiments, a bandwidth sample may be estimated as the congestion window size scaled by the RTT or based on the RTT. For example, the congestion window size may be scaled by bandwidth delay product which may be defined as the product of capacity (e.g., defined in bits or bytes per second) of the connection and its RTT (e.g., defined in seconds).

In a network, the actual performance experienced at any device connected to the network may depend on many factors, including the amount of data transmitted by that device or other devices connected to the network. Accordingly, a single sample of a network performance parameter may not be an adequate representation of the network performance. In some embodiments of the invention, bandwidth monitor 204 maintains a "baseline" representing network performance over a relatively long period of time. The baseline may be computed based on multiple samples taken over an interval. As described in greater detail below, bandwidth monitor 204 may compute the baseline using performance parameters available to it through TCP/IP stack interface 207. Bandwidth monitor 204 may update the baseline as new performance parameter samples are available. Bandwidth monitor 204 may store the baseline in any suitable way.

When computing the baseline, bandwidth monitor 204 may take into account variations in network performance parameters. These variations may be reflected in any suitable way. In the example illustrated, bandwidth monitor 204 accounts for variations by aggregating individual measurements. In the example illustrated, individual measurements are aggregated in two ways. First, sample values may be collected over a sample window. The sample window may have a duration of approximately one minute, but any suitable duration may be used. Secondly, bandwidth monitor 204 combines network performance parameter measurements taken in multiple successive windows when computing the baseline. In the embodiment illustrated, the values in multiple successive measurement windows may be combined using a moving average.

As a specific example, bandwidth monitor 204 may compute for each window parameters such as a mean bandwidth, a maximum bandwidth, a minimum bandwidth, a round trip time (RTT) and a variation in the round trip time. In each window, these values may be determined from multiple samples. As a specific example, a window size of one minute may be based on 12 consecutive samples spaced five seconds apart. At each five-second sample interval, the system may determine for each connection a window size and round trip time experienced on that connection. The mean bandwidth sample for any window may be the average of the 12 bandwidth samples obtained during that window. The maximum bandwidth sample for any window may be the maximum of the 12 bandwidth samples taken during that window. The minimum bandwidth sample may be the minimum of those 12 values. Similarly, the round trip time may be based on the average of the samples in that window. The variance on the round trip time may be computed as the variance of the 12 samples. These samples taken on a per-window basis may be combined to form a baseline as described in more detail below. For example, the baseline may contain a mean bandwidth, which may be computed by averaging bandwidth samples obtained in successive windows. Bandwidth monitor 204 may update the mean bandwidth value in the base line as each window passes and a new mean bandwidth sample value is available for the window. The baseline may also contain a value representing maximum bandwidth over multiple windows which may likewise be updated as each window passes and a new maximum value is available for that window. Values for minimum bandwidth over multiple windows may similarly be combined and form a part of the baseline which is updated as each window passes. Averages for the round trip time and variances in the round trip time may similarly be computed using measurements of those parameters obtained during each window.

In the example illustrated in FIG. 2, a baseline storage module 206 stores baseline information. Baseline storage module 206 may store such parameters as an average bandwidth maximum ($Max_{avg}$), average bandwidth minimum ($Min_{avg}$), mean bandwidth (Mean), mean RTT ($RTT_{ave}$), RTT variance ($RTT_{Var}$) and other suitable parameters. It should be appreciated that the $RTT_{ave}$ parameter may be used to calculate smoothed RTT (SRTT). The value of each bandwidth sample may be determined as described above (i.e., it may be scaled based on the RTT). Bandwidth samples collected over a time interval may be averaged. Extreme values of the bandwidth such as the average bandwidth minimum and average bandwidth maximum may be obtained by averaging minimum and maximum values of the bandwidth, respectively, detected over the time interval. In some embodiments of the invention, the window comprises one minute and twelve samples are collected during this interval (i.e., one sample every 5 seconds). However, it should be appreciated that embodiments of the invention are not limited in this respect and any suitable number of samples and a time interval may be substituted.

Figure 3:
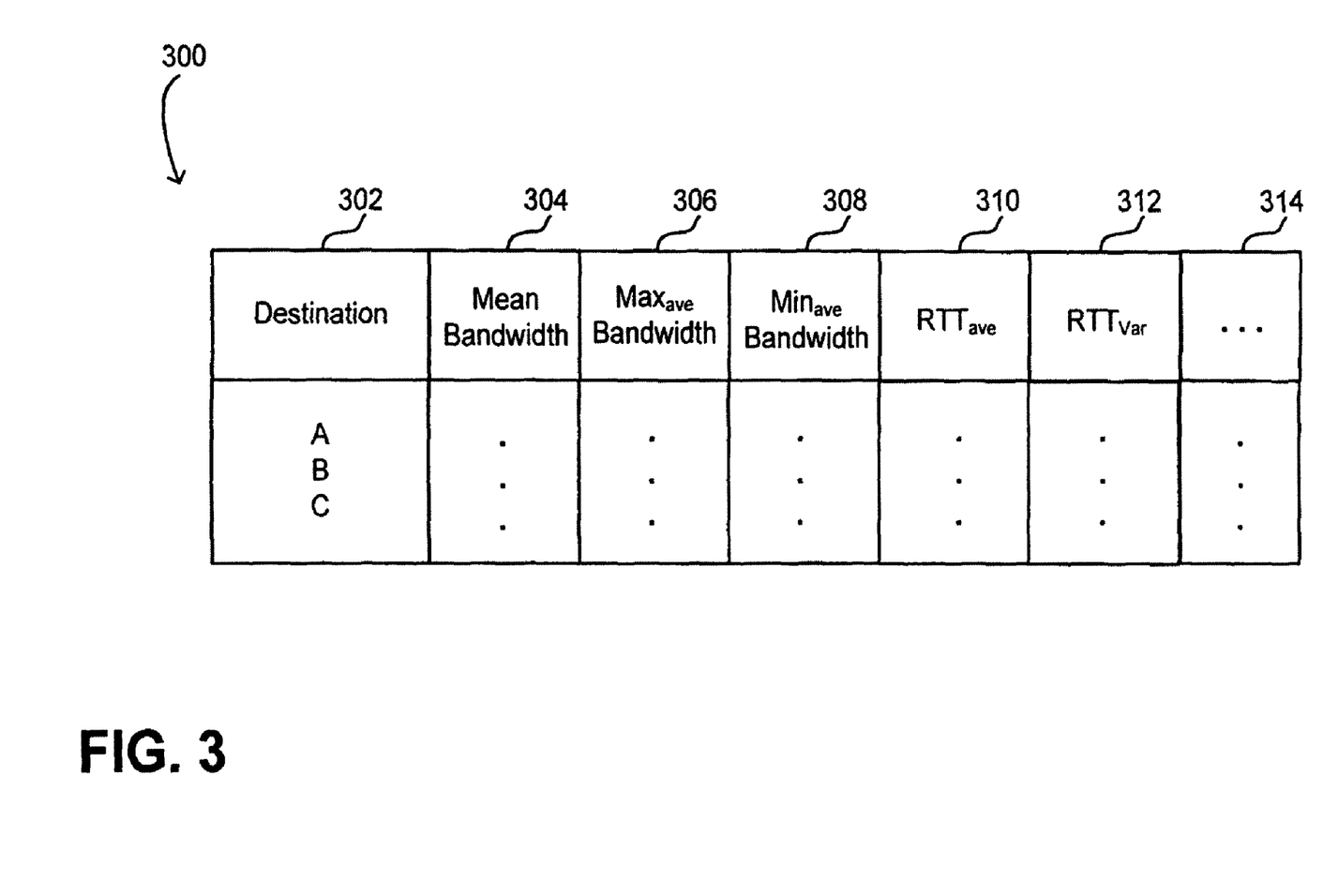
FIG. 3 is a sketch of an example of a data structure for a network performance baseline according to an embodiment of the invention.

FIG. 3 is a sketch of an example of a network performance baseline data structure 300 according to an embodiment of the invention. The baseline may be stored, for example, in baseline storage 206. As discussed above, in some embodiments, the baseline may be established and maintained for each destination 302 (shown in FIG. 3 by way of example only as A, B and C), i.e., for each device on a network communicating with the networked computer. For TCP/IP, destinations may be identified based on the destination end points established for connections. Accordingly, each destination may represent communications over more than one connection. However, the specific mechanism by which destinations are identified is not critical to the invention. Thus, for each destination, the mean bandwidth (Mean Bandwidth) 304, average bandwidth maximum ($Max_{avg}$ Bandwidth) 306, average bandwidth minimum ($Min_{avg}$ Bandwidth) 308, mean RTT ($RTT_{ave}$) 310 and RTT variance ($RTT_{Var}$) 314 may be stored in fields of the baseline data structure 300. It should be appreciated that the order in which network performance baseline parameters are maintained in the baseline may be any suitable order. In addition, in some embodiments, one or more of the shown network performance baseline parameters may be not calculated and stored as part of the baseline. Furthermore, the baseline may include any other suitable network performance baseline parameters, as shown by a field 314.

It should be appreciated that resources of system 200 may be limited. Consequently, information for a limited number of paths may be maintained. For example, in some embodiments, information for 32 paths may be maintained. Therefore, in some embodiments, it may be determined which paths of the currently used TCP paths may be considered relevant and should remain being used for measuring network performance parameters and maintaining the baseline and which may be discarded. For this purpose, certain path usage characteristics may be obtained and evaluated for each path information on which is being obtained for maintaining the baseline. For example, amount of usage of the path (e.g., the time the path is used for transmitting data as compared to the total time that all other paths are used for transmitting data), last usage time of the path (e.g., relative age of the path as compared to the total age of all other paths) and reliability of path data (e.g., "peaked in" percentage described below and a spread of the path bandwidth defined as $Max_{avg} - Min_{avg}$) may be evaluated. Other suitable path usage characteristics may be substituted as well. Thus, in some embodiments, baseline storage module 206 may store baseline information on the paths that have been selected as being relevant as described above.

In some embodiments of the invention, the network performance information may be obtained for connections (e.g., TCP paths) between a networked computer and other devices on a network. The network performance information may be averaged. This information may then be used to detect network performance degradation and diagnose sources of the degradation. A network performance baseline that may be established and maintained as discussed in detail below may be used in the diagnostics process.

Thus, in some embodiments of the invention, network performance information may be obtained by a networked computer (e.g., computer 102) connected to a WAN (e.g., WAN 112) through a local network (e.g., LAN 116). The performance information also may be obtained from other networked computers that are in communication with the networked computer on the LAN (e.g., computer 110) and from networked computers that are in communication with the networked computer on the WAN (e.g., computers 104-108). The obtained information may then be used to detect network performance and identify source(s) of the degradation. The sources may be, for example, network cross-traffic on the LAN or one or more networked computers on the WAN. The WAN sources may comprise, for example, an ISP or a single remote server.

In FIG. 2, network health monitor module 202 comprises diagnostics module 216 communicating with baseline storage module 206 and TCP/IP stack interface 207. Diagnostics module 216 may obtain network performance information provided by the TCP/IP network stack via TCP/IP stack interface 207. The information may then be compared with the network performance baseline information stored in baseline storage module 206.

In some embodiments, the network performance information may be used to determine whether the TCP path is suitable for interactive network applications such as, for example, remote desktop, network game applications and other suitable applications. Thus, network health monitor module 202 comprises an interactive support component 214 that determines whether the network supports the interactive application. This determination may be made in response to a request to initiate an interactive application generated by a user, an application component or in any other suitable way. Interactive support component 214 may obtain network performance information from baseline storage module 206 on a particular path to be used by the interactive application and determine whether that path can support network traffic to provide an acceptable user experience. It should be appreciated however that embodiments of the invention are not limited in this respect and the information may also be obtained either directly from the TCP/IP stack 208 or from the stack via the TCP/IP stack interface 207.

System 200 may include a user interface 218 that may display network performance information in any suitable way. For example, user interface 218 may comprise icons 220 used to display information on current connections (e.g., TCP connections), a status of network performance degradation detection, diagnostics of the network performance degradation and other suitable information. In embodiments of the invention deploying the Microsoft® Windows® Vista™ operating system, such icon as, for example, a "Network Health Monitor Connectivity Tray," "Troubleshoot Network Performance," and "MonitoringMode" icons may be provided. A user may click on the icons to enable respective actions. Various menus may be provided as well. For example, clicking on the "MonitoringMode" icon may initiate a process of monitoring the connection(s) to a remote destination (which may also be specified) or to multiple remote destinations. The monitoring may be performed automatically for a specified or default time interval. In some embodiments, monitoring may be performed automatically until a user takes an action to stop the process.

As discussed above, some embodiments of the invention provide a method of establishing and maintaining a network performance baseline for a communication path between a networked computer and at least one other networked computer connected via a network. In some embodiments, network performance information for the communication path may be obtained and compared to the network performance baseline. Other analyses of the network performance information may be performed as well. For example, thresholds may be employed for comparison with network performance parameters obtained from the network performance information. Deviation of the network performance parameters from the baseline may indicate network performance degradation. If the network performance degradation is detected, source(s) of the degradation may be identified. Also, the thresholds may be used to assist in identifying the sources of the network performance degradation. Furthermore, the network performance information may be used to determine whether the network supports interactive applications.

Figure 4:
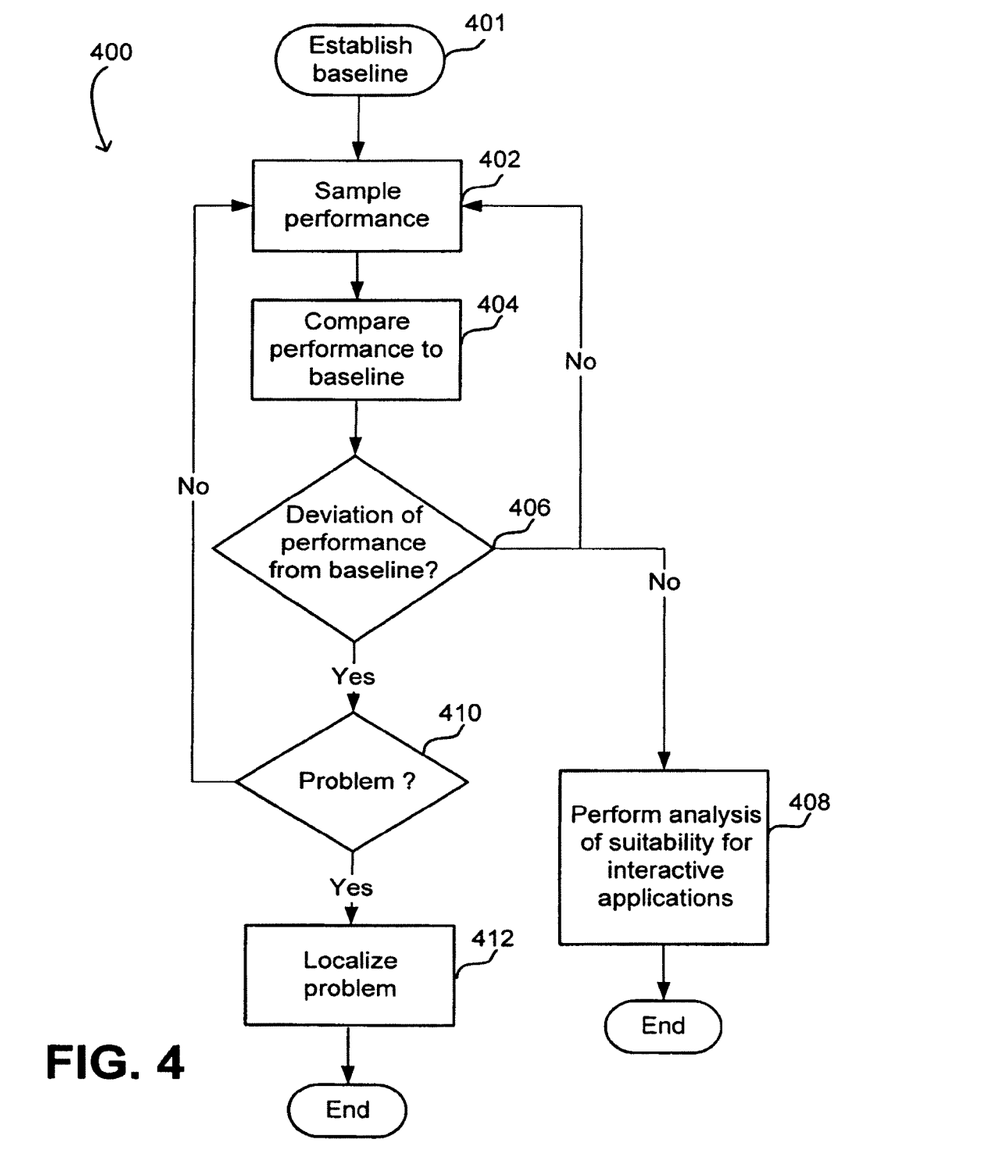
FIG. 4 is a flowchart of a method of using a network performance baseline according to some embodiments of the invention.

FIG. 4 illustrates an example of a process 400 of assessing performance of a network to detect network performance degradation and determine whether the network is suitable for interactive applications according to some embodiments of the invention. The process may start in block 401 where the network performance baseline may be established and maintained as discussed in more detail below. The process may then continue to block 402 where current network performance information may be obtained.

It should be appreciated that the network performance information may be processed to obtain network performance parameters. For example, for each window in the connection (e.g., a one-minute window), $Max_{avg}$ bandwidth, $Min_{avg}$ bandwidth, Mean bandwidth, $RTT_{ave}$ and $RTT_{Var}$ may be calculated.

The network performance information may include other information such as, for example, IP traffic counters that define a number of bytes received and a number of bytes sent by a networked computer on a local network. The counters may be obtained, for example, at one-minute intervals.

Any suitable method may be used to collect the network performance information. For example, it may be obtained from the network performance baseline stored in baseline storage module 206. The information may also be obtained either directly from the TCP/IP stack or from the stack via an interface (e.g., TCP/IP stack interface 207). Furthermore, the information may be obtained from any other suitable entities, including from a similar stack of another computer on LAN 116 (FIG. 1).

In block 404, the network performance parameters may be compared to the network performance baseline. For example, $Max_{avg}$ bandwidth, $Min_{avg}$ bandwidth, Mean bandwidth, $RTT_{ave}$ and $RTT_{Var}$ calculated for the last window may be compared to the respective parameters maintained as part of the baseline. It should be appreciated that embodiments of the invention are not limited in this respect and the network performance information may be assessed using any other suitable method. For example, thresholds may be employed to determine regions of acceptable values of network performance parameters.

In decision block 406, it may be determined whether the assessed network performance deviates from the baseline. It should be appreciated that the deviation may define as any suitable difference between the assessed and expected network performance. If no deviation is detected, the process may return to block 402 to continue sampling network performance. In some embodiments, the process may branch to block 408 where it is determined whether the network is suitable for interactive application. Interactive applications may require a bandwidth to support a data rate sufficiently fast to provide interactive response to users. The suitability analysis is discussed in more detail below in connection with FIG. 6. The process may then end.

If it has been determined in decision block 406 that the network performance deviates from the established baseline, the process may go to decision block 410 where it is determined whether the identified deviation indicates that there is a problem on the network. The problem may comprise any network performance degradation that may occur on the network. If it is determined that no network performance degradation has been detected, the process returns to block 402 to continue sampling network performance.

If network performance degradation has been detected in block 410, the process continues to block 412 to localize the problem, i.e., to identify source(s) of the network performance degradation. The performance degradation may be associated, for example, with cross-traffic on a local network, performance issues pertained to a remote server on a WAN, or problem(s) with an ISP that may affect network performance of multiple computers on the WAN. It should be appreciated that embodiments of the invention are not limited in this respect and any other suitable sources of network performance degradation may be identified. The process may then end.

As discussed above, in some embodiments of the invention, a network performance baseline is established and maintained for a communication path between a networked computer and at least one other networked computer connected via a network. To maintain the baseline, the network performance parameters may be measured and updated for the communication path.

Figure 5:
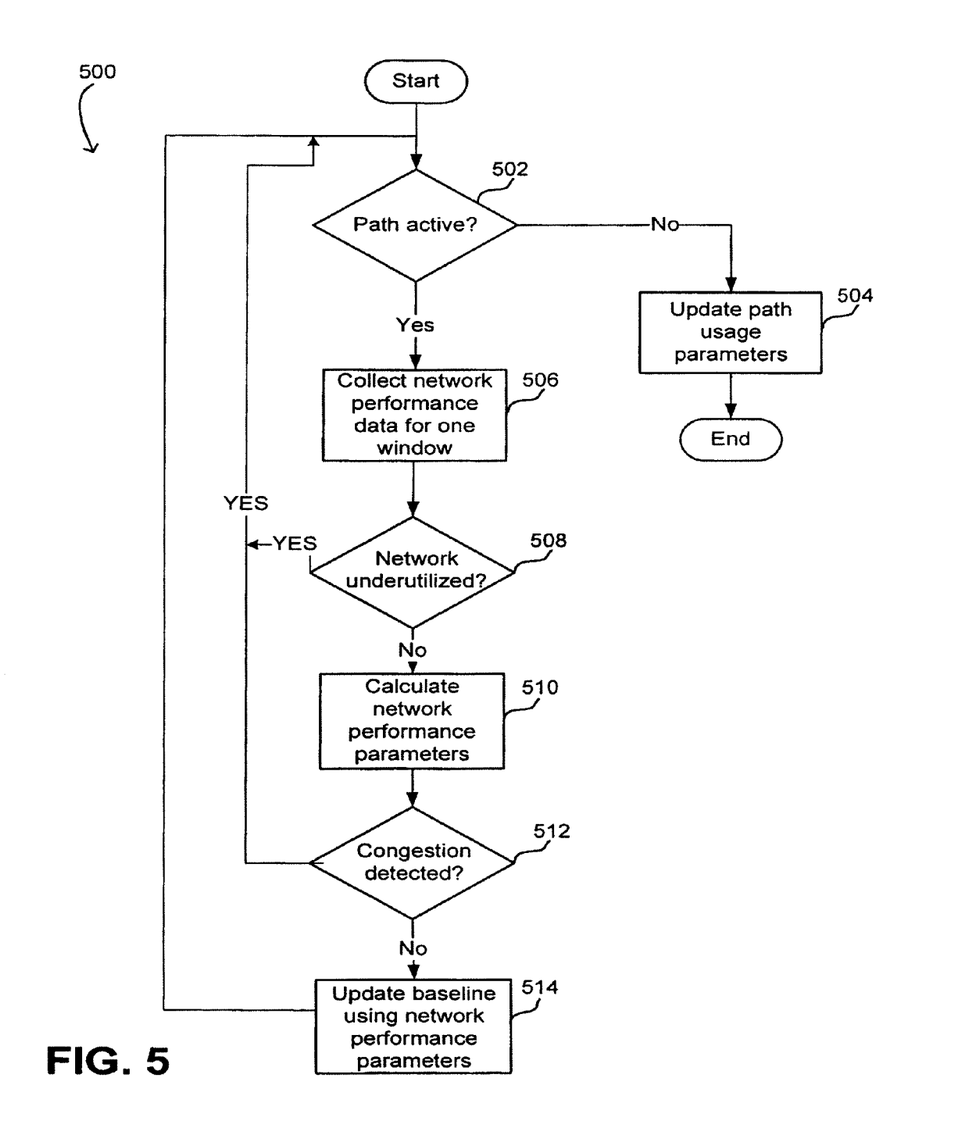
FIG. 5 is a flowchart of constructing a network performance baseline according to some embodiments of the invention.

As described above, the network performance parameters may include an estimated network bandwidth computed as a ratio of a congestion window size to round trip time. The inventors have appreciated that this approach to estimating bandwidth is most accurate when computer 200 is generating data at a rate that is relatively close to the bandwidth that may be supported by the network. To increase the accuracy of the baseline, the baseline may be updated for a path using only values obtained during time intervals when data transmitted on that communication path consumes a bandwidth approximately equal to its estimated bandwidth of the path. FIG. 5 demonstrates an example of the method of monitoring the network performance by maintain the baseline according to some embodiments of the invention.

A process 500 illustrated in FIG. 5 may start at any suitable time. It may be initiated automatically (e.g., when a networked computer establishes a connection with another computer on the network) or by a user performing an action. For example, the action may be taken via any suitable icon among icons 220 provided by the user interface 218 shown in FIG. 2. In the example illustrated, the network performance is monitored for one communication path (e.g., a TCP connection) between the networked computer and another device connected to the networked computer on a network. However, the process of FIG. 5 may be performed for any number of paths.

Process 500 may be executed using a sample of data obtained from TCP/IP stack 208 (FIG. 2).

In block 502, it may be determined whether the communication path is active. This determination may be made in any suitable way. For example, a network interface may maintain timers for a network connection, one of which may track time since the last successful communication with an endpoint. If this timer has a value less than a polling interval at which network performance data samples are collected, the path may be deemed active. However, any suitable mechanism to determine whether a path is active may be used.

If it is determined that the path in not active, the process may branch to block 504 where some network performance parameters of the path, referred to herein by way of example as path usage parameters, may be updated. For example, the $RTT_{ave}$ and $RTT_{Var}$ parameters may be updated. $RTT_{ave}$ and $RTT_{Var}$ may be stored as part of a network performance baseline maintained for the path. In addition, a duration of usage of the communication path, amount of usage of the path, a duration of time elapsed since a last usage of the least one path may be updated as well. These parameters may be stored in any other suitable component(s) of the networked computer. The paths that are not active are not considered further for monitoring network performance and the process may then end.

If it is determined in block 502 that the communication path is active, the process may branch to block 506 where network performance data may be collected for one window time interval. The window time interval may be of any suitable duration of time. For example, in some embodiments, a one-minute window is used. The window may comprise, for example, twelve samples of the network performance data. The network performance data may include RTT measurements or other delay parameters for the communication path. The parameters may be provided by the TCP/IP stack when it is polled by a bandwidth monitoring module (e.g., bandwidth monitor 204) which may poll the TCP/IP stack at certain time intervals. In some embodiments, bandwidth monitor 204 polls the stack every five seconds.

In decision block 508, it may be determined whether the network is underutilized. This comprises determining whether, during the time interval, communications on the path consumed a bandwidth within a range of an estimated bandwidth. Such conditions may occur when a "peaked in" flag is set for the path. The "peaked in" flag may be broadly defined as an indication of a connection condition when there are more data to send over a connection than the connection allows. It should be appreciated that the "peaked in" flag may be set in a data structure representing the path in suitable software component(s) and provides only an example of an indication that the amount of the traffic transferred over the path is acceptable and that the networked computer sends data at a rate that within the range of the estimated bandwidth. It should also be appreciated that other flags may be set and values considered in the data structure representing with the path.

In some embodiments, the "peaked in" flag is set when, during an interval, transmissions on the path consumed a bandwidth that exceeds a threshold percentage of the estimated bandwidth of the path. The threshold percentage may be any suitable value determined using any suitable method. Further, determining whether the communications on the path consumed the bandwidth within the range of the estimated bandwidth may comprise determining whether a sender congestion window has a size exceeding a threshold percentage of a value representing a product of the estimated bandwidth and an estimated round trip delay on the path. The sender congestion window may be set by the TCP/IP stack or by any other suitable component. This threshold percentage may be, for example, 75%.

If it is determined, in decision block 508, that the communications on the path consumed the bandwidth below the estimated bandwidth which may indicate that the network is underutilized, the process may return to block 502 where another path may be considered or the process may repeat on the same path during a later sample. However, as illustrated, when the network is underutilized while a sample was being collected, that sample is not used to compute an update to the baseline.

If it is determined, in decision block 508, that the communications on the path consumed the bandwidth within the range of the estimated bandwidth which may indicate that the network is not underutilized, the process may continue to block 510 where network performance parameters may be calculated for the last time interval window. The parameters may comprise, for example, $Max_{avg}$ bandwidth, $Min_{avg}$ bandwidth, Mean bandwidth, $RTT_{ave}$ and $RTT_{Var}$ and other suitable parameters. The parameters may be calculated from bandwidth samples collected during the last time interval window, which, in some embodiments, equals one minute.

In some embodiments of the invention, the network performance parameters, which may also be referred to as network performance baseline parameters, calculated for the path during a time interval at which congestion is detected may not be used for updating the network performance baseline. The network performance parameters obtained during congestion may corrupt the baseline.

The network performance parameters calculated in block 510 may be used to determine if there is congestion on the network, in block 512. Congestion may be determined using any suitable method. For example, it may be determined whether the communications on the path consumed the bandwidth within a range of the estimated bandwidth, or the throughput. RTT may increase during congestion. Further, it may be determined whether variations of network performance parameters (e.g., the bandwidth) of the path during the last time interval window exceeded a threshold. During congestion, variance of the bandwidth metric increases and the mean bandwidth value decreases due to increased number of fluctuation. In some embodiments, the following conditions may indicate congestion on the network: ($Max_{avg} - Min_{avg} >= Mean/2$) or ($Min_{window}/Max_{window} <= 0.5$). The $Min_{window}$ and $Max_{window}$ parameters define the minimum and maximum values of the bandwidth during the last time interval window, respectively. If congestion is detected, the process may return to block 502 where another path may be considered. If the congestion detection performed at block 512 has indicated that no congestion has been detected, the process may continue to block 514 where the network performance baseline is updated using the network performance parameters calculated for the last time interval window.

The network performance baseline for the communication path may be updated by maintaining moving averages which may be updated for each window $Max_{avg}$ and $Min_{avg}$ bandwidth parameters, which may be referred to as extreme values of a bandwidth metric, may be updated using an asymmetric moving average. Updating the moving average of these parameters comprises computing a weighed combination of the $Max_{avg}$ and $Min_{avg}$ bandwidth parameters computed during the last time interval window ($Max_{avg}$(Last Window) and $Min_{avg}$(Last Window)) and the moving average of the $Max_{avg}$ and $Min_{avg}$ bandwidth parameters computed in a prior interval, respectively. Factors used for weighing the combination may be selected based on the extreme value during the last time interval window relative to the moving average computed in the prior interval. A greater weight may be given to a sample in which the value of the extreme parameter is beyond the prior computed extreme.

If $Max_{avg} < Max_{avg}$ (Last Window), then $Max_{avg}$ (Last Window) will be weighted more heavily.

Then a moving average of the $Max_{avg}$ bandwidth may be calculated:

$$Max_{avg} = F_1 \times Max_{ave} + F_2 \times Max_{ave}(LastWindow). \qquad \text{Eq. (1)}$$

When $Max_{avg} < Max_{avg}$ (Last Window), $Max_{avg}$ is expanding. Factors $F_1$ and $F_2$ ("forgetting factors") may be defined as, for example, 7/8 and 1/8, respectively:

$$Max_{avg} = \frac{7}{8} \times Max_{ave} + \frac{1}{8} \times Max_{ave}(LastWindow). \qquad \text{Eq. (2)}$$

Conversely, if $Max_{avg} > Max_{avg}$(Last Window), $Max_{avg}$ is contracting. To prevent one sample from having a greater impact on what is intended to be an extreme value, $Max_{avg}$ (Last Window) may be given less weight. Factors $F_1$ and $F_2$ may take values of, for example, 99/100 and 1/100, respectively:

$$Max_{avg} = \frac{99}{100} \times Max_{ave} + \frac{1}{100} \times Max_{ave}(LastWindow). \qquad \text{Eq. (3)}$$

Eq. (1), (2) and (3) apply only after a moving average has been established. Initially, for a predetermined number of time interval windows, the $Max_{avg}$ (Last Window) may be used to update the baseline: $Max_{avg} = Max_{avg}$ (Last Window) if $Max_{avg}$ (Last Window) is larger. In some embodiments, the predetermined number may be 100.

A similar asymmetrical moving average may be applied at the other extreme for $Min_{avg}$. Initially, if $Min_{avg} > Min_{avg}$(Last Window), then, for a predetermined number of time interval windows, the $Min_{avg}$ (Last Window) may be used to update the baseline: $Min_{avg} = Min_{avg}$ (Last Window). In some embodiments, the predetermined number may be 100.

Then a moving average of the $\text{Min}_{avg}$ bandwidth may be calculated:

$$\text{Min}_{avg} = F_1 \times \text{Min}_{ave} + F_2 \times \text{Min}_{ave}(\text{LastWindow}). \quad \text{Eq. (4)}$$

When $\text{Min}_{avg} > \text{Min}_{avg}$ (Last Window), $\text{Min}_{avg}$ is expanding. Factors $F_1$ and $F_2$ may be defined as, for example, 7/8 and 1/8, respectively:

$$\text{Min}_{avg} = \frac{7}{8} \times \text{Min}_{ave} + \frac{1}{8} \times \text{Min}_{ave}(\text{LastWindow}). \quad \text{Eq. (5)}$$

If $\text{Min}_{avg} < \text{Min}_{avg}$ (Last Window), $\text{Min}_{avg}$ is contracting. Factors $F_1$ and $F_2$ may take values of, for example, 99/100 and 1/100, respectively:

$$\text{Min}_{avg} = \frac{99}{100} \times \text{Min}_{ave} + \frac{1}{100} \times \text{Min}_{ave}(\text{LastWindow}). \quad \text{Eq. (6)}$$

Utilizing asymmetric weighing factors network performance baseline parameters that represent extremes may, in some embodiments, be used to present a more accurate baseline. It should be appreciated that any suitable factors $F_1$ and $F_2$ may be selected. The factors may be selected automatically, set by a user or selected in any other suitable manner.

Other baseline parameters may be updated similarly, though in the illustrated embodiment, a symmetric moving average may be used. To update the bandwidth mean, Mean, for a predetermined number of time interval windows (e.g., 100), a linear average may be used:

$$\text{Mean} = \frac{\text{NumPreviousSamples} \times \text{Mean} + \text{Mean}(\text{LastWindow})}{\text{NumPreviousSamples} + 1}. \quad \text{Eq. (7)}$$

Then, a moving average may be used:

$$\text{Mean} = F_1 \times \text{Mean} + F_2 \times \text{Mean}(\text{LastWindow}). \quad \text{Eq. (8)}$$

It should be appreciated that any suitable factors $F_1$ and $F_2$ may be selected. For example, the factors may be set as 49/50 and 1/50, respectively. The factors may be selected automatically, set by a user or selected in any other suitable manner. Number of previous samples, or time interval windows, may be selected to reflect a time period over which measurements are likely to reflect current conditions, or in any other suitable way.

In some embodiments, to update the $\text{Max}_{avg}$ bandwidth of the baseline, it may be first determined whether a percent of a difference between $\text{Max}_{avg}$ and $\text{Max}_{avg}$ (Last Window) is less than a threshold (e.g., 10%). If this is the case, the $\text{Max}_{avg}$ may be updated in the same manner as the bandwidth mean. Similarly, if percent difference between $\text{Min}_{avg}$ and $\text{Min}_{avg}$ (Last Window) is less than a threshold (e.g., 10%), then the update algorithm for $\text{Min}_{avg}$ may be similar to that for updating the bandwidth mean.

Updating $\text{RTT}_{ave}$ and $\text{RTT}_{Var}$ may be performed in a manner similar to updating the bandwidth mean. Therefore, a linear average may be obtained for a predetermined number of time interval windows (e.g., 100) and a moving average may be calculated for the next time interval windows. It should be appreciated that any other suitable parameters may be stored and maintained as part of the network performance baseline. For example, SRTT may be stored and updated in a manner similar to updating the $\text{RTT}_{ave}$ and $\text{RTT}_{Var}$ parameters. It should be appreciated that time interval windows may be of any suitable duration of time.

It should be appreciated that updating the network performance baseline as described above is given by way of example only as other suitable methods may be substituted. After the baseline is updated using network performance parameters calculated for the last time interval window (given that no congestion has been detected), in block 514, the process may return to block 502 to analyze another path between the networked computer and other device on the network or to update the same path in a later window.

Figure 6:
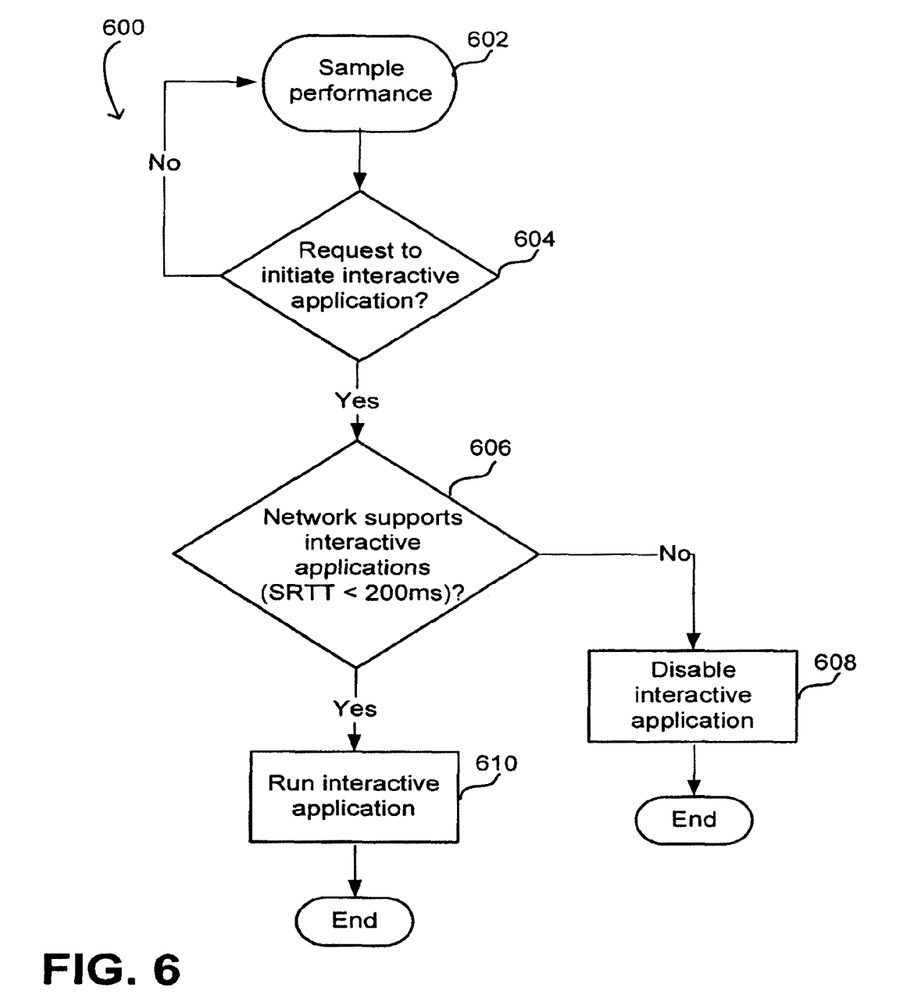
FIG. 6 is a flowchart of a method of determining whether a network supports interactive applications according to some embodiments of the invention.

As discussed above, network performance information may be used to determine whether the network supports interactive applications. A network with a low traffic delay may support interactive applications. FIG. 6 illustrates an example of a process 600 of determining whether a network supports interactive applications according to some embodiments of the invention. Process 600 may be performed by any device on a network (e.g., computer 102) using any suitable component(s). In some embodiments, interactive support component 214 shown in FIG. 2 may be employed.

Process 600 may be initiated at any suitable time. By way of example only, in FIG. 6, the process is shown to start at block 602 ("sample performance") where the network performance information is being obtained. The information may be sampled at suitable time intervals. Any suitable method, including the methods described above, may be used to collect the network performance information. For example, it may be obtained from the network performance baseline stored in baseline storage module 206. The information may also be obtained either directly from the TCP/IP stack or from the stack via an interface (e.g., TCP/IP stack interface 207).

In decision block 604, it may be determined whether a request to initiate an interactive application that interacts with the device has been received. If it has been determined in decision block 604 that no request to initiate an interactive application has been received, the process may return to block 602 to continue sampling network performance.

If the request has been received, the process branches to decision block 606 where it may be determined whether the network supports the interactive application. In the example illustrated, the network supports interactive application when SRTT parameter is lower than 200 ms (milliseconds). SRTT may be calculated using any suitable method, such as filtering a data stream reflecting successive samples of RTT. It should be appreciated that embodiments of the invention are not limited in this respect and any suitable threshold may be substituted.

In some embodiments, when the SRTT parameter is lower than 200 ms, it may be further determined whether RTT for a last sample is lower than 200 ms. If the answer is affirmative, it may be inferred that the network supports interactive applications. The network still supports applications if SRTT is lower than 200 ms and RTT for the last sample is greater than 200 ms. However, such conditions may indicate that there is a transient problem on the network.

If, in decision block 606, it has been determined that the network supports interactive applications, the process goes to block 610 to run an interactive application. The process may then end. Otherwise, if it has been determined that the network does not support interactive applications, the interactive application may be not permitted to run and disabled, in block 608. The process may then end. It should be appreciated that process 600 is shown to end at either block 608 or 610 by way of example only. Other implementations of the process may be substituted. For example, the process may continue to monitor for subsequent requests to initiate an interactive application.

As discussed above, network performance information for communication paths between a networked computer and other devices on a network may be obtained. The networked computer may be connected to other networked devices on a WAN via a LAN. The information may be assessed to determine whether the network is experiencing network performance degradation. Source(s) of the performance degradation may then be localized. The diagnosis may be performed using a method that can be referred to as a progressive elimination. Thus, a number of possible source(s) of the detected performance degradation may be progressively narrowed down. The sources may be, for example, network cross traffic on the LAN or one or more networked computers on the WAN. An ISP or a single remote server may be possible sources of network performance degradation.

Thus, in some embodiments, a networked computer may obtain network performance information on connections between the networked computer and other devices on the network. This may include tracking average network performance information during an interval of time. The average network performance information may include a network performance baseline that may be established and maintained for each communication path (e.g., a TCP connection) between the networked computer and other networked devices. The network performance information for the communication path may be obtained and compared to the network performance baseline. Also, thresholds may be employed for comparison with network performance parameters obtained from the network performance information. Deviation of the network performance parameters from the baseline may indicate network performance degradation. If the network performance degradation is detected, source(s) of the degradation may be identified. Also, the thresholds may be used to assist in identifying the sources of the network performance degradation.

Figure 7:
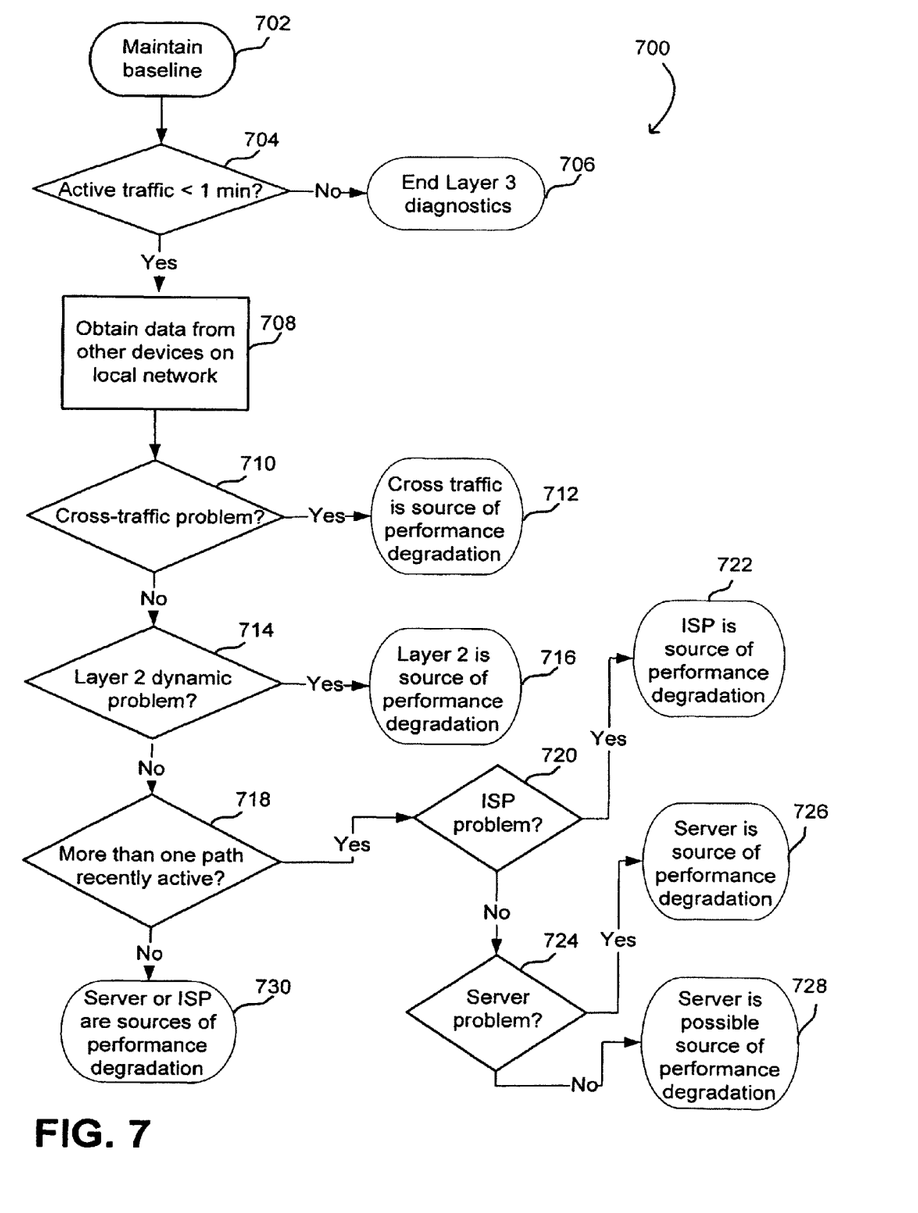
FIG. 7 is a flowchart of a method of detecting network performance degradation and diagnosing source(s) of the performance degradation according to some embodiment of the invention.

FIG. 7 is a flowchart of a method 700 of detecting network performance degradation and diagnosing source(s) of the performance degradation according to some embodiment of the invention.

The process may start at block 702 where the network performance baseline may be established and maintained as discussed above. It should be appreciated that block 702 is shown as the first block of the process by way of example only, to illustrate that, in embodiments of the invention, the network performance baseline may be employed to monitor network performance.

In block 704, it may be determined whether there has been active traffic on the network during a last time interval. Though in the example illustrated, the time interval is one minute, it should be appreciated that other suitable time intervals may be substituted. If it is determined that there has not been active traffic on the network during a last time interval, the process may go to block 706 where a layer 3 performance analysis may be finished.

If the process reaches termination point 706, the source of the degradation may be deemed to have been caused by components within the computing device managing layer 3 interconnect functions. For example, this state may indicate that the computer is improperly configured for accessing the network. However, any suitable layer 3 diagnostics may be used to diagnose any number of layer 3 connection problems. Regardless of the specific mechanism by which layer 3 connection problems are detected, if no such problems are detected, process 700 proceeds to perform tests that may detect other types of problems.

If it is determined that there has been active traffic on the network during a last time interval, the process may branch to block 708 where network communication information may be obtained from at least one other networked computer on the LAN. The network communication information may be, for example, RTT, the bandwidth metric computer as described above, IP traffic counters and other suitable information which may be obtained using any suitable method. For example, in embodiments of the invention where a Microsoft® Windows® operating system is deployed, a Link Layer Topology Discovery (LLTD) protocol operating over both wired (e.g., using the IEEE 802.3 standard protocol) and wireless (e.g., using the IEEE 802.11 standard protocol) media may be used. The LLTD protocol provides a discovery service, LLTD Quick Discovery, which may be used to enumerate all LLTD-capable devices in communication with the networked device on the LAN. The LLTD Quick Discovery may query each of the devices for its IP traffic counters information. The counters comprise a number of bytes received and a number of bytes sent. The counters may be sampled, for example, at one-second intervals. Previously obtained counters may be maintained for a time interval. In some embodiments, the interval comprises at least 3 seconds.

In block 710, it may be determined whether the network performance degradation can be attributed to cross traffic as a source of the problem. Cross-traffic may be detected from counters with high values or in any other suitable way. The cross-traffic analysis may be used to determine if the performance problem is caused by concurrent network traffic in the local network (e.g., a subnet) sharing the network infrastructure. In some embodiments, the cross-traffic detection may include using LLTD Quick Discovery. The performance degradation may be caused by network cross traffic when the network communication information indicates that traffic on the local network is above a threshold. It should be appreciated that embodiments of the invention are not limited in this respect and any suitable threshold may be used. If it has been determined that the cross-traffic is the source of the network performance degradation, the process may end in block 712.

If it has not been determined that the cross-traffic is the source of the network performance degradation, the process may go to block 714 where it may be determined whether the network performance degradation can be attributed to a layer 2 dynamic problem as a source of the performance degradation. The layer 2 dynamic problem may be a media-specific dynamic problem (e.g., a problem associated with Wi-Fi interference, low signal strength and other problems). Tests to detect layer 2 problems are known, and processing at block 714 may entail any one or more known tests for layer 2 dynamic problems. However, any suitable tests, whether now known or after developed, may be employed at block 714.

In some embodiments, if the networked computer is wireless, then in addition to the above, if any other wireless device on a network has a throughput (e.g., the total number of bytes sent and bytes received) that exceeds a threshold, a cross-traffic network congestion may be identified. The threshold may be defined as 0.5 Mbps (mega bytes per second). It should be appreciated that embodiments of the invention are not limited in this respect and other suitable thresholds may be substituted. Such problems may exist because the communication media is shared among the wireless devices and even if only one device is using the media for a longer time than other devices, this device may eventually pull the throughput of the networked device. If it has been determined that the layer 2 dynamic problem is the source of the network performance degradation, the process may end in block 716.

If it has been determined that the layer 2 dynamic problem is not the source of the network performance degradation, the process may go to block 718 where it may be determined whether more than one communication path between the networked computer and at least one another networked device has been recently active.

If no paths were active or only one path has been recently active, insufficient information may be available to distinguish between the various sources of network degradation. Accordingly, process 700 may branch from 718 to termination point 730. If process 700 reaches termination point 730, the source of the network degradation may be identified as having been caused by a server, the ISP. Alternatively, at termination point 730, the source of the degradation may be deemed to be cross-traffic on the local network that was not detected at block 710.

If it has been determined that more than one communication path has been recently active, the process may go to block 720 where it may be determined whether the network performance degradation can be attributed to a problem at an ISP. Average network performance information on the paths may be compared to the respective baselines for the paths. If the comparison indicates that network performance is below the baseline for more than one path of the paths per a device in communication with the networked device, it may be determined that an ISP is a source of the performance degradation. Also, an ISP may be identified as a source of the performance degradation if congestion is detected on all of the paths that have been recently active using the method described above. It should be appreciated that embodiments of the invention are not limited in this respect and other suitable ways of determining that an ISP may be a source of the performance degradation may be substituted. If it has been determined that an ISP is a source of the performance degradation, the process may end in block 722.

If it has been determined that a source of the performance degradation is not an ISP, the process may branch to block 724 where it may be determined whether the degree of confidence with which a remote may be deemed the source of the network performance degradation. A remote server communicating with the networked computer over the paths that have been recently active may be identified as a source of the network performance degradation if the network performance is below the baseline for one path of the paths between the networked computer and the remote server and/or if congestion is detected on one path. Further, for the remote server to be identified as a source of the network performance degradation, network performance on other paths is above the baseline for those paths and no signs of congestion are detected for those paths. If this is the case, the diagnostics process may end at block 726. In other situations, for example, if other paths has been active for an amount of time below a threshold (i.e., the paths may be considered not sufficiently recent which may be determined using any suitable method) or baselines for the paths are determined to be broad (e.g., when $Max_{ave} - Min_{ave} > Mean$), it may be determined that the remote server is a possible source of the network performance degradation, in block 728.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a networked computer connected to a first network through a second network to determine a source of network performance degradation, the method comprising:
   tracking, during an interval of time, network performance information for communications on a plurality of paths, wherein each path is between the networked computer and a device on the first network;
   obtaining network communication information from at least one other networked computer on the second network;
   attempting to identify a source of the performance degradation by:
      determining whether a source of the performance degradation is network cross traffic by ascertaining whether the network communication information indicates that traffic on the second network is above a first threshold;
      determining whether a source of the performance degradation is access to the first network by ascertaining whether the network communication information does not indicate that traffic on the second network is above the first threshold and the network performance information indicates a performance degradation with communications associated with a number above a second threshold of the plurality of paths; and/or
      determining whether a source of the performance degradation is a device that is an endpoint of a path of the plurality of paths by ascertaining whether the network communication information does not indicate traffic on the second network above the first threshold and the network performance information indicates a performance degradation with a number of the plurality of paths that is below a third threshold; and
   if a source of the performance degradation is identified, providing an indication of the identified source.

2. The method of claim 1, wherein the network communication information comprises a measurement, for each path, of a number of bytes sent and/or a number of bytes received by the networked computer.

3. The method of claim 1, wherein the second network is a wireless network, and the method further comprises determining whether a source of the performance degradation is a dynamic problem at a data link layer if the network communication information indicates that a throughput of at least one networked computer on the local network is above a fourth threshold.

4. The method of claim 1, wherein the second threshold is one.

5. The method of claim 1, wherein the third threshold is greater than two.

6. The method of claim 1, wherein the average network performance information indicates the performance degradation of communications associated with the number above the second threshold of the plurality of paths if congestion on the first network is detected.

7. The method of claim 1, wherein tracking the network performance information for the plurality of paths during the interval of time comprises maintaining a network performance baseline for each of the plurality of paths.

8. The method of claim 7, wherein the performance degradation on the wide area network is detected if the network communication information indicates that a network performance of the first network is below the network performance baseline for multiple paths of the plurality of paths.

9. The method of claim 7, wherein the performance degradation on the wide area network is detected if the network communication information indicates congestion.

10. The method of claim 7, wherein maintaining the network performance baseline comprises measuring and updating network performance parameters of the network performance baseline.

11. The method of claim 10, wherein measuring and updating the network performance parameters comprises determining whether values of the network performance parameters are within an expected range.

12. A tangible computer-readable medium article having a plurality of computer-executable modules for operating a networked computer connected to at least one device over at least one network, the computer-executable modules comprising:
  computer-executable modules for determining a source of network performance degradation, the computer-executable modules comprising:
    at least one computer-executable module for tracking, during an interval of time, network performance information for communications on a plurality of paths, wherein each path is between the networked computer and a device on a first network;
    at least one computer-executable module for obtaining network communication information from at least one other networked computer on a second network;
    a plurality of computer-executable modules for attempting to identify a source of the performance degradation, comprising:
      at least one computer-executable module for determining whether a source of the performance degradation is network cross traffic by ascertaining whether the network communication information indicates that traffic on the second network is above a first threshold;
      at least one computer-executable module for determining whether a source of the performance degradation is access to the first network by ascertaining whether the network communication information does not indicate that traffic on the second network is above the first threshold and the network performance information indicates a performance degradation with communications associated with a number above a second threshold of the plurality of paths; and
      at least one computer-executable module for determining whether a source of the performance degradation is a device that is an endpoint of a path of the plurality of paths by ascertaining whether the network communication information does not indicate traffic on the second network above the first threshold and the network performance information indicates a performance degradation with a number of the plurality of paths that is below a third threshold; and
  computer-executable modules for determining whether the at least one network supports an interactive application, the computer-executable modules comprising:
    at least one computer-executable module for tracking network performance information for communications between the networked computer and the at least one device over the at least one network; and
    at least one computer-executable module for, in response to a request to initiate the interactive application that interacts with the at least one device, providing an indication, based on the network performance information, whether the at least one network supports the interactive application.

13. The tangible computer-readable medium article of claim 12, wherein:
  the second threshold is one; or
  the third threshold is greater than two.

14. The tangible computer-readable medium article of claim 12, wherein tracking the network performance information for the communications between the networked computer and the plurality of devices on the first network during the interval of time comprises maintaining a network performance baseline for at least one communication path between the networked computer and the plurality of devices on the wide area network.

15. The tangible computer-readable medium article of claim 12, wherein the network performance information for communications between the networked computer and the at least one device over the at least one network comprises an estimate of a communication delay between the networked computer and the least one device, and providing the indication whether the at least one network supports the interactive application comprises providing an indication that the at least one network supports the interactive application if the communication delay is below a threshold.

16. A networked computer, connected to a first network through a second network, comprising at least one processor programmed to:
  track, during an interval of time, network performance information for communications on a plurality of paths, wherein each path is between the networked computer and a device on the first network;
  obtain network communication information from at least one other networked computer on the second network;
  attempt to identify a source of the performance degradation by:
    determining whether a source of the performance degradation is network cross traffic by ascertaining whether the network communication information indicates that traffic on the second network is above a first threshold;
    determining whether a source of the performance degradation is access to the first network by ascertaining whether the network communication information does not indicate that traffic on the second network is above the first threshold and the network performance information indicates a performance degradation with communications associated with a number above a second threshold of the plurality of paths; and/or
    determining whether a source of the performance degradation is a device that is an endpoint of a path of the plurality of paths by ascertaining whether the network communication information does not indicate traffic on the second network above the first threshold and the network performance information indicates a performance degradation with a number of the plurality of paths that is below a third threshold.

17. The networked computer of claim 16, wherein the at least one processor is programmed to obtain the network communication information at least in part by measuring, for each path, a number of bytes sent and/or a number of bytes received by the networked computer.

18. The networked computer of claim 16, wherein the second network is a wireless network, and wherein the at least one processor is programmed to determine whether a cause of the performance degradation is a dynamic problem at a data link layer by ascertaining whether the network communication information indicates that a throughput of at least one networked computer on the second network is above a fourth threshold.

19. The networked computer of claim 16, wherein the second threshold is one.

20. The networked computer of claim 16, wherein the third threshold is greater than two.

* * * * *